US011381575B2

(12) United States Patent
Damour et al.

(10) Patent No.: US 11,381,575 B2
(45) Date of Patent: Jul. 5, 2022

(54) CONTROLLING ACCESS TO RESOURCES OF EDGE DEVICES

(71) Applicant: Microsoft Technology Licensing, LLC, Redmond, WA (US)

(72) Inventors: Kevin Thomas Damour, Redmond, WA (US); David Michael Sauntry, Redmond, WA (US); Peter Gregg Miller, Bellevue, WA (US); Sindhura Tokala, Bellevue, WA (US); Tara Sanathanan Prakriya, Redmond, WA (US); Bhawandeep Singh Panesar, Bellevue, WA (US); Lawrence Brozak Sullivan, Jr., Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 398 days.

(21) Appl. No.: 16/510,460

(22) Filed: Jul. 12, 2019

(65) Prior Publication Data
US 2020/0351274 A1 Nov. 5, 2020

Related U.S. Application Data

(60) Provisional application No. 62/843,237, filed on May 3, 2019.

(51) Int. Cl.
*H04L 9/40* (2022.01)
*G06F 9/46* (2006.01)
(Continued)

(52) U.S. Cl.
CPC ............ *H04L 63/105* (2013.01); *G06F 9/468* (2013.01); *G06F 9/5005* (2013.01); *H04L 67/34* (2013.01)

(58) Field of Classification Search
CPC ... H04L 63/105; H04L 63/083; H04L 63/102; H04L 67/34; G06F 9/468; G06F 9/5005;
(Continued)

(56) References Cited

U.S. PATENT DOCUMENTS 8,060,285 B2    11/2011    Chigusa
9,118,656 B2 *   8/2015    Ting .................... H04L 63/0815
(Continued)

FOREIGN PATENT DOCUMENTS

WO    2011043559 A2    4/2011
WO    2017106619 A1    6/2017
WO    2018038700 A1    3/2018

OTHER PUBLICATIONS

"International Search Report and Written Opinion Issued in PCT Application No. PCT/US2020/026960", dated Jul. 16, 2020, 11 Pages.
(Continued)

*Primary Examiner* — Khoi V Le
(74) *Attorney, Agent, or Firm* — Alleman Hall Creasman & Tuttle LLP

(57) ABSTRACT

Systems and methods for controlling an edge computing device. The method includes, receiving a user input requesting access to a resource of the edge computing device, determining whether the user has privileges to access the resource by: formulating a claims request which requests claims based on the determined identity of the user, sending the claims request to a local claims provider agent executed by a processor of the edge computing device, determining, based on claim request handling factors, whether the local claims provider agent can generate a token including the requested claims, and if so, generating the token with the requested claims; if not, a request may be sent to a cloud service-side claims provider to receive the token. The method includes authorizing access to the resource based on
(Continued)

a predetermined policy that specifies the presence of a predefined resource parameter in the requested claims is sufficient.

20 Claims, 7 Drawing Sheets

(51) Int. Cl.
    *H04L 67/00*     (2022.01)
    *G06F 9/50*     (2006.01)

(58) Field of Classification Search
    CPC .... G06F 21/31; G06F 21/6218; H04W 12/08; H04W 12/06; H04W 4/44
    See application file for complete search history.

(56) References Cited

U.S. PATENT DOCUMENTS

| | | | |
|---|---|---|---|
| 9,229,905 B1 | 1/2016 | Penilla et al. | |
| 9,483,886 B2 | 11/2016 | Bergerhoff et al. | |
| 9,604,651 B1 | 3/2017 | Amireddy et al. | |
| 2007/0112574 A1 | 5/2007 | Greene | |
| 2013/0061309 A1* | 3/2013 | Diaz-Cuellar | H04L 63/102 726/9 |
| 2014/0189808 A1* | 7/2014 | Mahaffey | H04L 63/0853 726/4 |
| 2015/0221151 A1* | 8/2015 | Bacco | H04L 63/107 340/5.83 |
| 2016/0112429 A1 | 4/2016 | Sundaresan et al. | |
| 2017/0099176 A1 | 4/2017 | Jain | |
| 2017/0295154 A1 | 10/2017 | Jackson et al. | |
| 2018/0239349 A1* | 8/2018 | Rasmussen | G01C 21/3415 |
| 2018/0359244 A1 | 12/2018 | Cockerill et al. | |
| 2019/0109849 A1* | 4/2019 | Frempong | H04L 63/105 |

OTHER PUBLICATIONS

"Automotive IoT aka Connected Cars", Retrieved from: https://www.deviceauthority.com/industries/automotive, Retrieved Date: Apr. 26, 2019, 06 Pages.

"Connected Cars Security", In White Paper of Inwebo, Apr. 11, 2016, 03 Pages.

Darshini, et al., "Multilevel Security System for Automotives using RFID and Biometric Techniques in LabVIEW", In International Journal of Advanced Research in Electrical, Electronics and Instrumentation Engineering, vol. 2, Issue 4, Apr. 2013, pp. 1467-1473.

Hsu, et al., "Reconfigurable Security: Edge Computing-based Framework for IoT", In Journal of Computing Research Repository, Sep. 19, 2017, pp. 1-8.

Kaufman, et al., "Communicating Securely in an Insecure Medium", In Publication of Prentice Hall, Jun. 28, 2002, 06 Pages.

Maler, Eve, "Seamless Authentication and Access Management: Securing the Connected Car and Customer Experience", Retrieved from: https://internetofthingsagenda.techtarget.com/blog/IoT-Agenda/Seamless-authentication-and-access-management-Securing-the-connected-car-and-customer-experience, Nov. 15, 2016, 03 Pages.

Peng, et al., "A Multilevel Access Control Scheme for Data Security in Transparent Computing", In Journal of Computing in Science & Engineering, vol. 19, May 25, 2016, 14 Pages.

Schiebl, Florian, "BlueID—Secure offline device authentication for IoT Cars", Retrieved from: http://crossborder-technologies.com/sites/default/files/BlueID%20Introduction%202016.pdf, Feb. 18, 2016, 25 Pages.

Zorz, Mirko, "Infosec Expert Viewpoint: Connected Car Security", Retrieved from: https://www.helpnetsecurity.com/2018/01/11/infosec-expert-viewpoint-connected-car-security/, Jan. 11, 2018, 05 Pages.

\* cited by examiner

Exemplary Claim Hierarchy for a Music Streaming Service:

//music/streaming/service/username/ServiceLevel

| service | service1, service2, service3, service4, ... |
|---|---|
| username | username1, username2, username3, username4, username5, ... |
| ServiceLevel | ServiceLevel1, ServiceLevel2, ServiceLevel3, ServiceLevel5, ... |

Exemplary Claim Sets Referenced by Labels

CONTROLLING ACCESS TO RESOURCES OF EDGE DEVICES

CROSS REFERENCE TO RELATED APPLICATIONS

This application claims priority to U.S. Provisional Patent Application Ser. No. 62/843,237 filed May 3, 2019, the entirety of which is hereby incorporated herein by reference for all purposes.

BACKGROUND

Recently, wireless connectivity and compute power have been provisioned in increasingly small computing devices, enabling these computing devices to communicate over the Internet with cloud services in a technological trend that has been referred to as the Internet of Things (IoT). Such computing devices have been referred to as edge computing devices since they are provisioned at the logical edge of a computing network, e.g., within equipment or in a facility near the end user, as opposed to at the logical center of such a system in a data center or within the intermediate networking hardware that forms the Internet and connects the data center to the edge computing device itself. This trend is greatly increasing the number of connected devices and the complexity of inter-connectivity of people, services, and objects they interact with. The large-scale nature of all these entities creates complex scenarios for effectively managing and enforcing authorization associations within a software system that is implemented in an environment including edge computing devices. These authorization associations may be defined between people, services, and objects that are logically defined within the software system, and are utilized when an action is requested by a person interacting with the software system to enable an access control system of the software system to permit or deny the requested action involving users, resources, and/or operations, based upon these associations.

SUMMARY

A method is provided for controlling an edge computing device. The method includes, at the edge computing device, identifying an authentication factor of a user or a system process at the edge computing device, determining an identity of the user or the system process based upon an authentication factor, and receiving an input from the user or the system process requesting access to or configuration of a resource of the edge computing device. The method further includes determining whether the user or the system process has privileges to access the resource or configure the resource by: formulating a claims request which requests claims based on the determined identity of the user or the system process, sending the claims request to a local claims provider agent executed by a processor of the edge computing device, determining, based on one or more claim request handling factors, that the local claims provider agent can generate a token including the requested claims, and in response, generating the token with the requested claims. The method further includes receiving at an access control program, the token including the requested claims, inspecting the claims to identify a predefined resource parameter, and authorizing access to or configuration of the resource based on a predetermined policy that specifies the presence of the predefined resource parameter in the requested claims is sufficient to allow access to the resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present invention relates to claims based authorization of access to resources or configuration of resources in software systems. Methods, systems, computer program products and data structures are described which allow for efficient, fine-grained authorization data and decision policy to be processed for access control at multiple levels including cloud-based services and IoT edge device processing. Authorization associations defined between people, offered services/collection operations, and objects are organized as claims on individual people (or a principal identity which may represent a person or an automation), services, and object records (an exemplar would be a vehicle) and as well as their cross associations. Specific controls are provided to permit direction of claims to specific levels for decision and enforcement. Efficient authorization decisions can be made by properly combining these claims and evaluating against an access policy expression.

Figure 1:
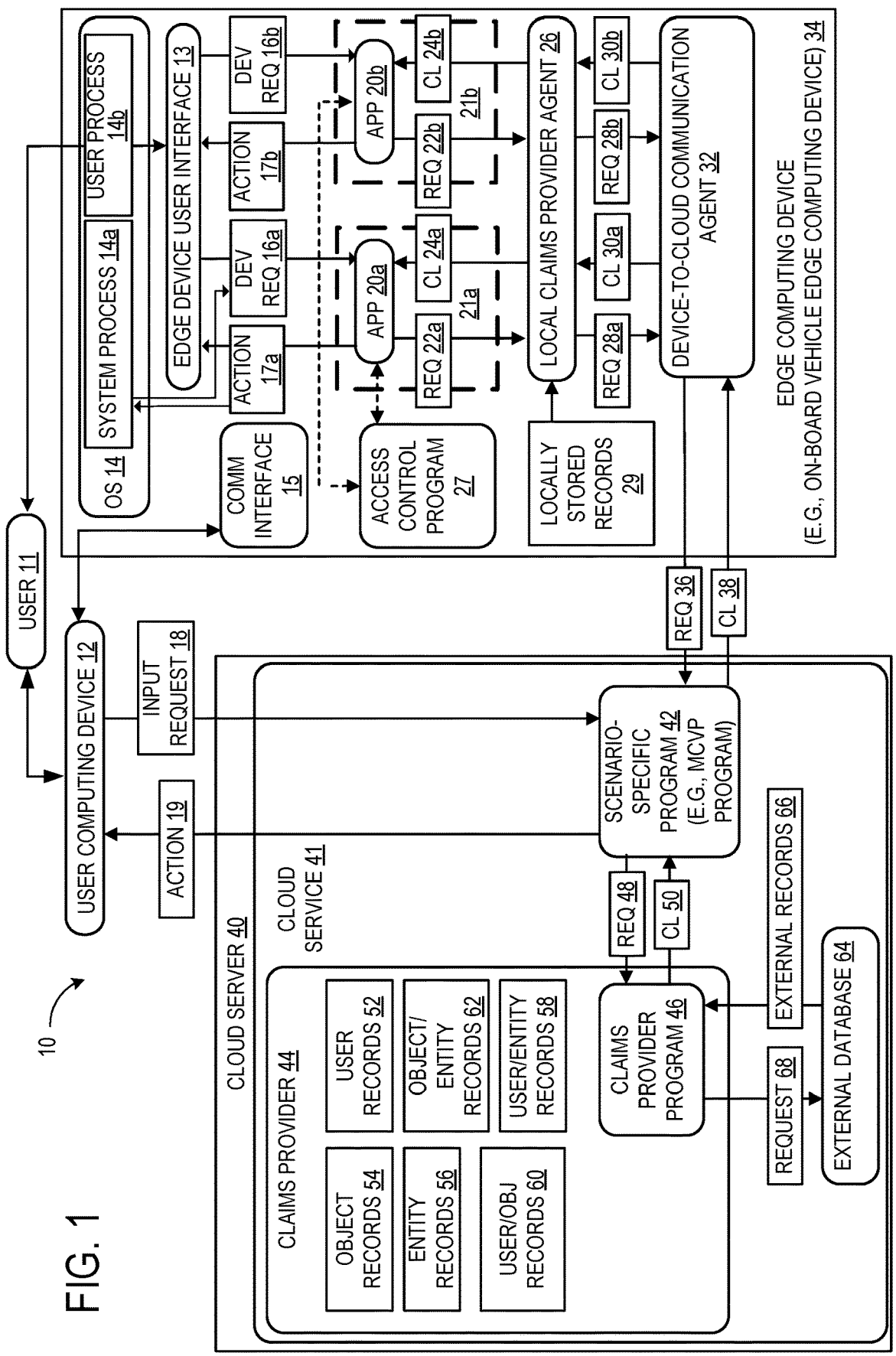
FIG. 1 illustrates an access control system for use with an edge computing device according to an example embodiment of the present disclosure.

FIG. 1 illustrates a distributed computing system including an access control system 10 that utilizes claims-based authorization for controlling access to software resources or controlling the configuration of software resources with multiple levels of claims generation distributed between a cloud server 40 and an edge computing device 34. Hereafter, the control of access to resources and the authorization of access to resources will be understood in this disclosure to also refer to the control of the configuration of resources and the authorization of configuration of resources, respectively. The cloud server 40 includes a cloud-based scenario-specific program 42 and an edge computing device 34 with a local claims provider agent 26. A cloud service 41 may be executed on the cloud server 40. In one example, the cloud-based scenario-specific program 42 is a server of the Microsoft® Connected Vehicle Platform (MCVP) executed in a Microsoft® Azure® IoT Hub environment. The processor is scenario specific because it executes software that is programmed specifically to control the edge computing device in a particular scenario, such as connected vehicle scenario. Myriad other scenarios are also contemplated, such as industrial robotics, home automation, fleet logistics, etc.

A user computing device 12 operated by a user 11 sends an input request 18 to the cloud server 40. The input request 18 for the cloud level is received and processed by the scenario-specific program 42, which validates the identity of the requestor for the input request 18 and verifies the correct format for the input request 18. Likewise, an edge device user interface 13 of an edge computing device 34 operated by a user 11 sends a device input request 16a. The edge device user interface 13 may be operated by the user 11 via a user process 14b generated by an application program executed by the user 11 on an operating system (OS) 14 of the edge computing device 34. The device input request 16a for the device level is received and processed at the edge computing device 34, which determines the identity of the requestor for the device input request 16a and verifies the correct format for the request 16a. The device input request 16a may contain a user input from the user (requestor) 11 requesting access to a resource of the edge computing device 34, and a user authentication factor, such as a biometric parameter (e.g., thumbprint, facial features, eye scan, or infrared signature of the user 11), a signal received from of a key FOB, smartphone, smartwatch, or other proxy device, user interaction (which may include, e.g., entry of a login ID and PIN or password) with a user interface of the edge computing device 34 via graphical, hard buttons, voice, etc. or via a communications interface (e.g., Bluetooth connection) with the edge computing device 34 using a user computing device 12 such as a smartphone.

At the edge computing device 34, a user authentication factor of a user is identified in a device input request 16a, an identity of the user is determined based upon the user authentication factor in the device input request 16a, and a user input is received from the user 11 at an edge device user interface 13 requesting access to a resource of the edge computing device 34. The edge computing device 34 may have a communication interface 15 to facilitate communication between the user 11, the user computing device 12, and the edge computing device 34. The communication interface 15 may be a Bluetooth receiver or WiFi access point, for example.

The edge computing device 34 determines whether the user has privileges to access the resource by: formulating a claims request 22a which requests claims based on the determined identity of the user, send the claims request 22a to a local claims provider agent 26 executed by a processor of the edge computing device 34, and determine, based on one or more claim request handling factors, that the local claims provider agent 26 can generate a token including the requested claims, and in response, generate the token with the requested claims 24a.

The edge computing device 34 may send the claims request 22a to a local claims provider agent 26 executed by a processor of the edge computing device 34, and determine, based on one or more claim request handling factors, whether the local claims provider agent 26 can generate a token including the requested claims. When it is determined that the local claims provider agent 26 can generate the token, then the local claims provider agent 26 generates the token with the requested claims 24a. When it is determined that the local claims provider agent 26 cannot generate the token including the requested claims, then based on this determination, the local claims provider agent 26 sends a request 28a to a cloud service-side claims provider 44 executed by the cloud server 40 over a computing network and receives a token including the requested claims 30a from the cloud service-side claims provider 44 in response. An access control program 27 receives the token including the requested claims 24a, inspects the claims 24a to identify a predefined resource parameter, and authorizes access to the resource based on a predetermined policy that specifies the presence of the predefined resource parameter in the requested claims 24a is sufficient to allow access to the resource.

As part of the processing, the scenario-specific program 42 and/or the local claims provider agent 26 interpret which users, resources, and/or operations are required to fully process the received input request 18 or the device input request 16a, respectively, and sends a claims request to the claims provider 44 based on the determined identity of the requestor along with the requested users, resources, and/or operations determined to be required to fully process the input request 18 or the device input request 16a. The claims provider 44 may refer to external databases 64 to process the request 48 or store data contained in the request 48. The claims provider 44 determines relationships between the users, resources, and operations that are associated with the user and/or resource. The claims provider 44 then generates one or a plurality of claims based on the request 48, and outputs the one or the plurality of claims in a token to the scenario-specific program 42 and/or the local claims provider agent 26. The token with resultant claims outputted by the claims provider 44 may have claim names in a format that specifies the target level for the claim to be utilized.

In the present disclosure, the term "identity" will be used to represent a set of attributes that describes a user or some other entity in the secure system. The determined identity in the input request 18 or the device input request 16a may be the principal identity of the requestor or identification information from an object such as a connected device in the case of IoT applications. The principal identity of the requestor may identify a person, an organization, or an entity executing an automated process, for example.

The term "claim" will be used to describe a statement that the claims provider 44 makes about a user, a resource, and/or operation. This statement indicates an authorization assigned to a user, a resource, a user and a resource, a user and an operation, or a resource and an operation. A claim for a user and a resource may authorize the user to use the resource, a claim for a user and an operation may authorize the user to use the operation, and a claim for a particular resource and an operation may authorize an operation to be used for the particular resource. The resource and requested operation are associated with application programs executed on the edge computing device 34, and access to the resource for the requested operation by the requesting user 11 is controlled by an access control program 27 of the operating system of the edge computing device 34, based on the claims, within a secure environment for each application program 20a and 20b. The application programs 20a and 20b themselves may be associated with a service offering delivered to the user 11 via the edge computing device 34, and aspects of the service offering may be controlled via the scenario specific program, such as a program implementing a connected vehicle platform, as depicted.

Each claim may include a key and value corresponding to an authorization assigned to a user, a vehicle, a user and a vehicle, a user and a service, or a vehicle and a service. The key and value may indicate one of a plurality of authorization levels. For example, the claims provider 44 may return a token containing claims 50 to the scenario-specific program 42. Each token may have a claim path and one or more claims. The claim path is a unique code that is formatted in a predetermined format to describe a claim. As one example, the formatted claim name may be coded as: "//device[:deviceName[:module]]/key," where "//" indicates the use of a level targeted claim. In this example, "device" indicates the IoT Edge Device Processing level, the square brackets indicate optional content where ":deviceName" is a specific device referred to as "deviceName", ":module" is an optional specified module within the targeted level, and "key" is the claim key name. The claim key name may include '/' characters to indicate a claim hierarchy, where multiple claims within a hierarchy provide localized context for the claim. An example claim hierarchy may be "/service/option1" and "/service/option2" where option1 and option2 are within the context of "service".

Figures 2A, 2B:
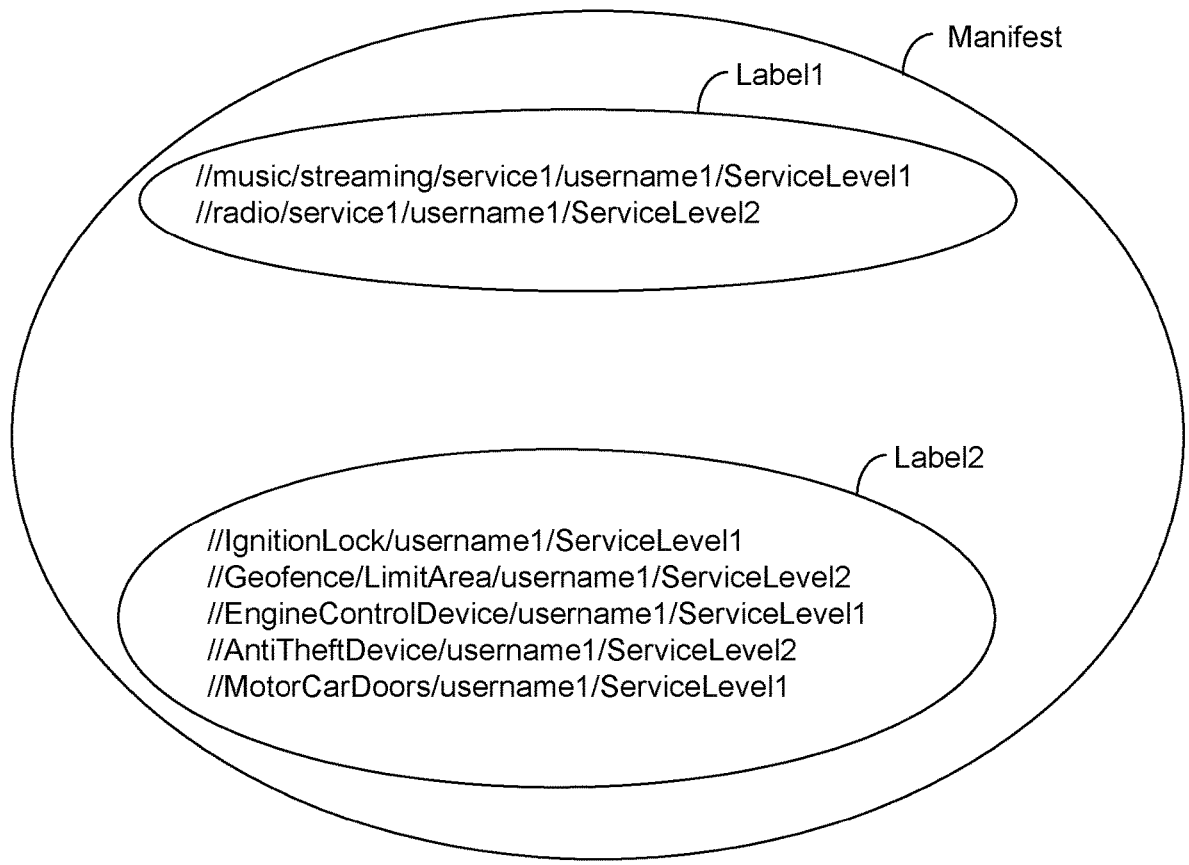
FIG. 2A illustrates a claim hierarchy for a music streaming service according to an example embodiment of the present disclosure.
FIG. 2B illustrates claim sets referenced by labels according to an example embodiment of the present disclosure.

Referring to FIG. 2A, the claim hierarchy may extend multiple levels. For example, when a music streaming service offers multiple services (service1, service2, for example), which are offered to multiple users (username1, username2, for example), where each user may configure one of multiple possible service levels (ServiceLevel1, ServiceLevel2, for example), one example claim hierarchy may be "//music/streaming/service1/username1/ServiceLevel1". A claim may be coded with only a "key" specified to indicate that the claim applies to the overall processing and may or may not be associated with any particular level.

The edge computing device 34 may require a set of claims for various operations within the edge computing device 34 as well as modules running within the vehicle. Referring to FIG. 2B, a set of claim paths may be grouped together as a claim set and referenced by a label. For example, claimpath1 and claimpath2 may be grouped together by a Label1; and claimpath4 through claimpath7 may be grouped together by a Label2. The set of all labels and claim paths specified in the claim set is referred to as a manifest. The manifest must be provisioned for a vehicle as only the claim paths present in the manifest will be allowed to be transferred to the edge computing device 34 of the vehicle.

Referring back to FIG. 1, based on a predetermined policy, the local claims provider agent 26 may inspect the claims in the local device input request 16a to identify a predefined resource parameter, and make decisions and perform access control enforcement for local device input requests 16a, authorizing or denying access to the requested users, resources, and/or operations contained in the local device input request 16a based on a predetermined policy. Responsive to receiving and inspecting the claims in the local device input request 16a, an application 20a of the edge computing device 34 may perform actions 17a at the device level. Likewise, responsive to receiving and inspecting the claims in the local device input request 16b, an application 20b of the edge computing device 34 may perform actions 17b at the device level. The scenario-specific program 42 and local claims provider agent 26 may communicate with each other to inspect these claims in the local device input request 16a to identify a predefined resource parameter and authorize access to the resource based on the predetermined policy that specifies the presence of the predefined resource parameter in the requested claims is sufficient to allow access to the resource. The localized processing is not limited to device level only processing by the local claims provider agent 26: input requests 18 and device input requests 16a may be processed at the cloud level at the scenario-specific program 42 or device level at the local claims provider agent 26 based on the implementation of the processing operation and the predetermined policy applied for the processing operation.

Likewise, based on a predetermined policy, the scenario-specific program 42 may inspect the claims in the input request 18 to identify a predefined resource parameter to perform access control enforcement for the input request 18. In other words, in enforcing access control, responsive to receiving and inspecting the claims in the input request 18, the scenario-specific program 42 may either perform the action/operation 19 or reject the input request 18 if the policy is not satisfied by the set of claims returned by the claims provider 44. If the target level of the claim is at the device level, the claim is communicated through the scenario-specific program 42 to the local claims provider agent 26.

The predetermined policy to enforce may be an authorization policy that is considered part of the scenario-specific program 42 and local claims provider agent 26, but may alternatively be provided by other external means or processes. Additionally, the returned claims from the claims provider 44 may be used to provide fine-grain controls over the processing of the input requests 18 and device input requests 16a by the scenario-specific program 42 or local claims provider agent 26 dependent on the implementation and the target level contained within the claims.

Referring to the cloud-based claims provider 44, a provider processor program 46 receives a given claims request 48 from the scenario-specific program 42, and then referring to a series of records present within databases to compile and send a set of claims 50 (one or more claims) to the scenario-specific program 42. The provider processor program 46 utilizes a set of policies to determine associations between the users (information contained in the user records 52), resources (information contained in the object records 54), and the operations (services or collection operations) (information contained in the entity records 56). The records include association information (records describing associations between users, services, and objects, or associations between users, operations which are services, and resources which are objects), claims, profiles, telematic, or model information but is not restricted to only this set of information. Additional association records may be present to provide further refinement of associations such as ones for the person interacting with the specific object (represented by the cross-association user/object records 60), a person's specific details with a service (represented by the cross-association user/entity records 58), or cross-association object/entity records 62). The associations may describe a combination of users and services, services and objects, users and objects, and/or a combination of users and services and objects. The series of records may describe hierarchical relationships of the associations. These three representative cross additional association records are only examples of many possible cross association records and the invention does not restrict the usage of other types of association records utilized by the provider processor program 46. The records may be created from external data sources 64 such as databases or services supplying the information, or may be the authoritative holding of the respective records within databases in the claims provider 44.

The use and management of data within the records may be accessed by other requesting services for a range of operations. The incoming request 48 may contain scoping information to restrict the range of association claims 50 returned to the scenario-specific program 42. Furthermore, a date range may be returned in the claims 50 which restricts the timeframe that the claims 50 are considered valid and another request is needed if the current time is outside this date range. In other words, at least one of the claims may have a range of validity for a predetermined limited time period, or an expiration time and date. If there are no records indicating association between the person and the object, an empty response 50 or error may be returned. Any of the claims may contain a formatted claim name.

As an example of the organization of records within the claims provider 44, the formatted Record Identifier (RecordID) for a claims record may be coded as: "Claim|VehicleID|UserID|ServiceID," where "|" indicates the levels of the claims in the claims record. Each record may include one or more claims. In this example, "VehicleID" indicates the vehicle, "UserID" indicates the user, and "ServiceID" indicates a service. It will be appreciated that only one or two levels may appear in the RecordID, if the claim is an authorization assigned to a user ("Claim||UserID|"), a vehicle ("Claim|VehicleID||"), a user and a vehicle ("Claim|VehicleID|UserID|"), a user and a service ("Claim||UserID|ServiceID"), or a vehicle and a service ("Claim|VehicleID||ServiceID"). Accordingly, the RecordID for the claims record is formatted to describe the associations between the users, services, and objects.

Figure 3A:
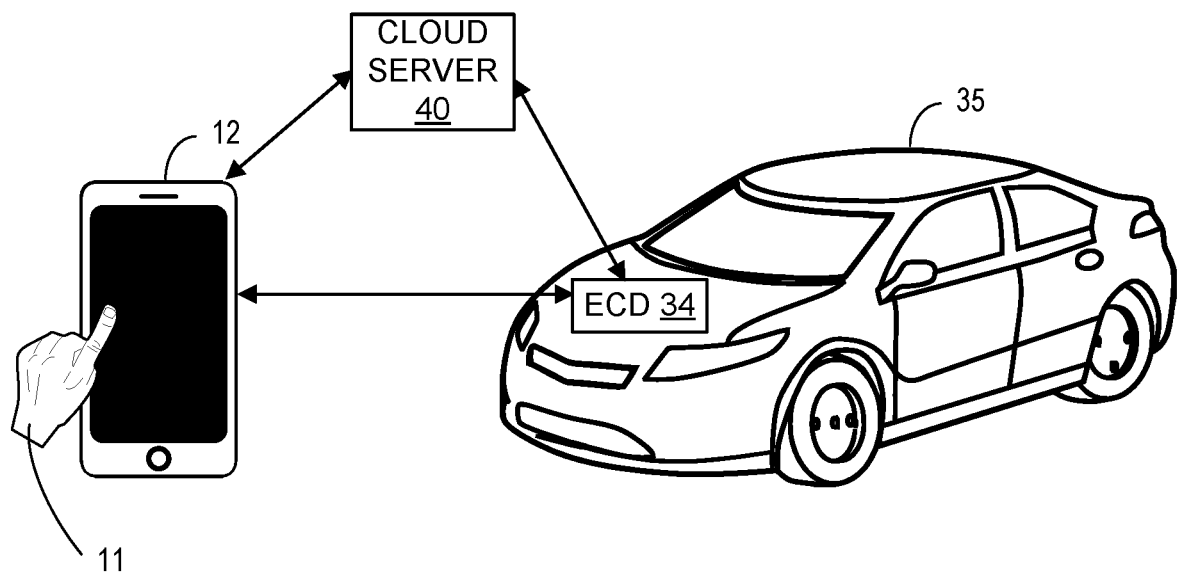
FIG. 3A illustrates an access control system for use with an edge computing device of a vehicle according to an example embodiment of the present disclosure.
Figure 3B:
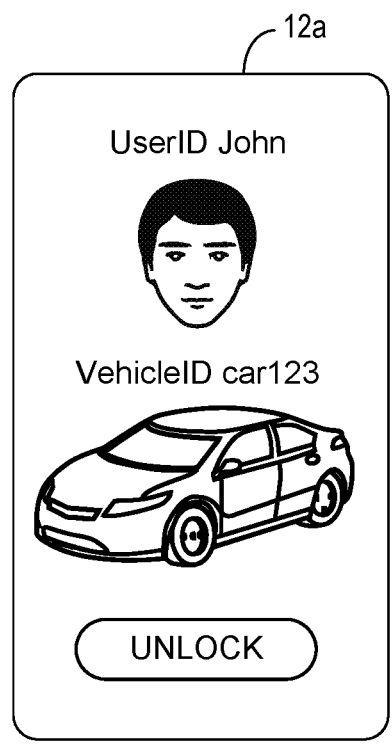
FIGS. 3B and 3C illustrate a user interface of a user computing device communicating with an edge computing device of a vehicle or a cloud server according to an example embodiment of the present disclosure.

Referring to FIGS. 3A-D, an illustrative example is provided for the automotive industry. This example does not restrict the operation or utility of the invention but is provided to provide greater insight on the invention. An IoT enabled connected vehicle 35 is owned by a user 11 and several connected services are subscribed to by the user 11. For this specific example, the vehicle 35 is the object instance and services subscribed are one of the entity instances. Referring to FIGS. 1 and 3A, in processing by the system 10, an input request 18 is sent by a computing device 12 of a user 11 named "John" to the cloud server 40 to utilize a service on the vehicle 35 with ID name "car123". The service may be a satellite radio service or car rental, for example. The input request 18 may be a request to access for an operation on a resource requested by the requesting user 11, such as an ignition lock, an engine control device, anti-theft device, or car doors, for example. Referring to FIG. 3B, the user may interact with a graphical user interface of the computing device 12 requesting to unlock a service of the vehicle 35. The scenario-specific program 42 of the cloud server 40 receives the input request 18, interprets which users, resources, and/or operations are required to fully process the received input request 18, and sends a request 48 to the claims provider 44 based on the determined identity of "John" as the requesting user, determined to be required to fully process the input request 18.

Figure 3C:
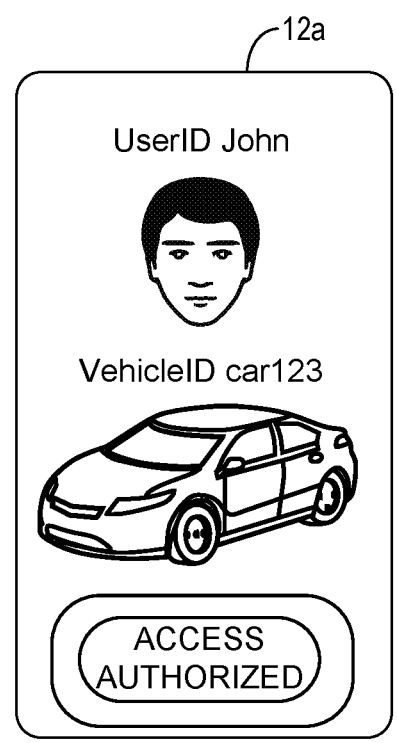
Figure 3D:
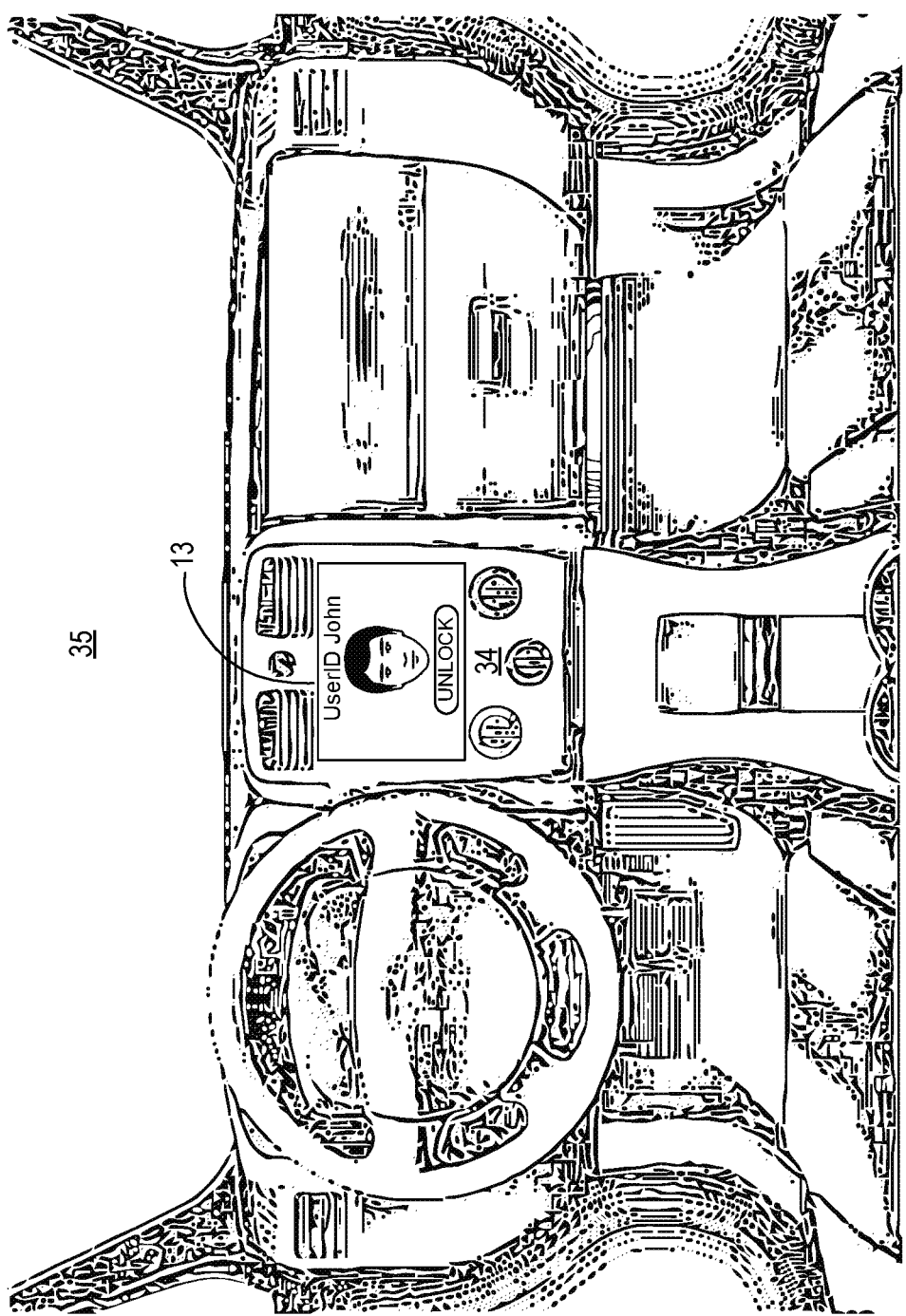
FIG. 3D illustrates an edge device user interface of an edge computing device of a vehicle according to an example embodiment of the present disclosure.

Referring to FIG. 3D, the user 11 may interact with an edge device user interface 13 built into the edge computing device 34 installed on the vehicle 35. In this embodiment, a device input request 16a is sent by an edge device user interface 13 operated by a user 11 named "John" to utilize a service on the vehicle with ID name "car123". An application 20a executed on the edge computing device 34 of a vehicle receives the device input request 16a. The application 20a may be a satellite radio application. Responsive to receiving the device input request 16a, a request 22a for radio claims may be formulated based on the device input request 16a and sent to the local claims provider agent 26 on the edge computing device 34. The application 20a may be assigned a unique identifier and placed within a security boundary 21a to isolate the application 20a resources from the rest of the system 10 and from application 20b.

Likewise, another device input request 16b may be sent by the edge device user interface 13 operated by the user 11 to utilize a mapping service on the vehicle with ID name "car123". A mapping application 20b executed on the edge computing device 34 of the vehicle receives the device input request 16b. Responsive to receiving the device input request 16b, a request 22b for mapping claims may be formulated based on the device input request 16b and sent to the local claims provider agent 26 on the edge computing device 34. The application 20b may be assigned a unique identifier and placed within a security boundary 21b to isolate the application 20b resources from the rest of the system 10 and from application 20a.

The device input requests 16a and 16b may contain a user input from the user (requestor) 11 requesting access to a resource of the edge computing device 34, and a user authentication factor, such as a digital key, certificate, a biometric signature, an operation of a key FOB, interaction with a user display device, an infrared signature of the user, or a user login and password, for example. Determining the identity of the requestor may involve the application 20a and application 20b communicating with an access control program 27 to identify the user authentication factor of the user 11 at the edge computing device 34, and determining an identity of the user (requestor) 11 based upon the user authentication factor. Upon determining the identity of the user (requestor), the application 20a and application 20b are authorized to formulate requests 22a and 22b for the claims of their respective applications based on the determined identity of the user, and send the claims requests 22a and 22b to the local claims provider agent 26. To determine whether the user has privileges to access the requested resource or obtain configuration settings contained in the device input requests 16a and 16b, the requests 22a and 22b are sent to the local claims provider agent 26 executed by a processor of the edge computing device 34.

Responsive to receiving the request 22a for radio claims, the local claims provider agent 26 determines whether the user has privileges to access the requested resource contained in the device input request 16a. Based on one or more claim request handling factors, the local claims provider agent 26 determines that it can generate a token including the requested claims. Responsive to the local claims provider agent 26 determining that it can generate the token including the requested claims, the token including the requested claims 24a and/or 24b is generated. For example, after receiving the request 22b for mapping claims and formulating a claims request 28b based on the determined identity of the user, when the one or more claim request handling factors include the presence of unexpired claims in a cached memory of the edge computing device 34, then the local claims provider agent 26 may determine that it can generate the token by retrieving the requested, unexpired claims from the cached memory of the edge computing device 34 and including them in the token.

If the local claims provider agent 26 determines that it is not able to generate the token due to the data not being contained within the local claims provider agent 26 or because the data has expired, the local claims provider agent 26 may formulate a claims request 28a based on the determined identity of the user.

Accordingly, the local claims provider agent 26 generates a token including the requested claims responsive to determining one or more claim request handling factors. The claim request handling factors include the presence of the requested claims that are still unexpired in the memory of the edge computing device 34, but may also include predetermined rules authorizing the local claims provider agent 26 to generate tokens including certain categories of requested claims. For example, predetermined rules may authorize the local claims provider agent 26 to generate tokens including claims that authorize users to drive the vehicle. Mirroring the cloud-based claims provider 44, the local claims provider agent 26 may look up and receive object records, entity records, user records, object/entity records, user/object records, and user/entity records that are locally stored records 29 stored locally in mass storage within the edge computing device 34. For example, when the user 11 named "John" sends an input request 16a to drive the vehicle with ID name "car123", application 20a is a car access application, and the user/entity records reveal that the user is registered to drive the vehicle "car123", then the local claims provider agent 26 compiles a token containing claims with RecordID "Claim||John|", where the claim has a key that states //Service, and the claim has a value that states ["car key"] containing a claim to access to the car ignition, and the local claims provider agent 26 sends the token containing claims 24a to the application 20a, which then sends the token to the access control program 27. The access control program 27 inspects the claims 24a to identify a predefined resource parameter and performs an action 17a granting the user 11 access to the car ignition when the access control program 27 determines, based on a predetermined policy, that the presence of a predefined resource parameter in the claims 24a is sufficient to allow access to the car ignition.

When the local claims provider agent 26 determines that it cannot generate the token including the requested claims, it may send a request 36 to a cloud service-side claims provider 44 executed by the cloud server 40 over a computing network and receives a token including the requested claims 30a from the cloud service-side claims provider in response. To obtain the token including the requested claims 30a, the local claims provider agent 26 may send the claims request 28a to the device-to-cloud communication agent 32 to retrieve claims from the cloud server 40. Responsive to receiving the request 28a for claims from the cloud, the device-to-cloud communication agent 32 may send a request 36 for claims to the scenario-specific program 42 of cloud server 40. The scenario-specific program 42 may receive the request 36 from the edge computing device 34, interpret which users, resources, and/or operations are required to fully process the request 36, and send a request 48 to the claims provider 44 based on the determined identity of "John" along with the requested users, resources, and/or operations determined to be required to fully process the request 36.

The device-to-cloud communication agent 32 may send a request 36 to the scenario-specific program 42 via a specialized Device to Cloud process. The specially formatted request 36 may request the scenario-specific program 42 to have one or more claim sets from the manifest of the vehicle to be sent to the edge computing device 34 of the vehicle. The request 36 may have a header that indicates that the request 36 is for claims, or the header may indicate that the request 36 is for a reset of the claims. The body of the request 36 may contain a list of labels corresponding to claim sets specified in the manifest.

In response, the claims provider 44 may look up user records 52 for the user, an object record 54 for the vehicle, and a range of records for the services subscribed in entity records 56 from the information contained in the user records 52 and object records 54. In certain embodiments, if certain records are stored in an external database 64, a request 68 for external data may be sent to the external database 64, and the provider processor program 46 may receive external records 66 from the external database 64 in response. If the user/entity records 58 reveals that the user is registered to use the satellite radio service, then the provider processor program 46 may compile a token containing claims with RecordID "Claim||John|", where the claim has a key that states //Service, and the claim has a value that states ["satellite radio"] containing a claim to the satellite radio service, and sends the token containing claims 50 to the scenario-specific program 42. This claim authorizes "John", the user, to use the satellite radio service. If an object record 54 reveals that the vehicle with ID name "car123" is registered to use the satellite radio service, then the claims provider 44 may compile a token with RecordID "Claim|car123||", where the claim has a key that states //Service, and the claim has a value that states ["satellite radio"] containing a claim to the satellite radio service, and send the token containing claims 50 to the scenario-specific program 42. This claim authorizes the vehicle "car123" to use the satellite radio service. It will be appreciated that the records in the claims provider 44 may be created via a secure online portal, which allows users to register themselves and others to use specific vehicles, for example.

If the user/object records 60 reveal an association between the vehicle "car123" and "John" that is registered to use the satellite radio service, then the provider processor program 46 may compile a token with RecordID "Claim|car123|John|", where the claim has a key that states //Service, and the claim has a value that states ["satellite radio"] containing a claim to the satellite radio service, and send the token containing the claims 50 to the scenario-specific program 42. This claim authorizes the user "John" to use the satellite radio service in the vehicle "car123".

The claims may authorize not only specific services, but authorize restrictions on a vehicle, such as GeoFencing, which restricts movements of the vehicle to predetermined geographic areas. For example, if an object record 54 reveals that the vehicle with ID name "car123" is restricted to operating within City A, then the claims provider 44 may compile a token with a claim that would be stored in a record with RecordID "Claim|car123||", where the claim has a key that states //Geofence/LimitArea, and the claim has a value that states ["City A"] containing a claim to restricting the movements of the vehicle to City A, and send the token containing claims 50 to the scenario-specific program 42.

Responsive to receiving the claims 50 from the claims provider 44, the scenario-specific program 42 may send claims to the device-to-cloud communication agent 32 via a specialized Cloud to Device process. The token containing the claims 50 may have a header that indicates the token contains claims, or the token may have a header that indicates that the claims are to be refreshed, or reset to an original default setting. The body of the token may contain the requested labels and the respective claims specified in the manifest of the vehicle.

Responsive to receiving the claims 38 in a token, the device-to-cloud communication agent 32 of the edge computing device 34 may send claims 30*a* and 30*b* to the local claims provider agent 26. If the claims were requested by a mapping application 20*b*, then the local claims provider agent 26 may send mapping claims 24*b* to the application 20*b*. If the claims were requested by a satellite radio application 20*a*, then the local claims provider agent 26 may send radio claims 24*a* to the application 20*a*, which then sends the token with the radio claims 24*a* to the access control program 27. The access control program 27 receives the token including the requested claims 24*a*, then inspects the claims 24*a* to identify a predefined resource parameter and, based on a predetermined policy, make decisions and perform access control enforcement for the device input request 16*a* by performing an action 17*a*, authorizing or denying access to the requested users, resources, and/or operations contained in the local device input request 16*a*. Referring to FIG. 3C, an authorization or denial of access may be indicated on a user interface 12*a* of the user computing device 12 or the edge device user interface 13 of the edge computing device 34 of the vehicle 35. In other words, the access control program 27 inspects the claims 24*a* to identify a predefined resource parameter, and authorizes access to the resource based on the predetermined policy that specifies that the presence of the predefined resource parameter in the claim is sufficient to allow access to the resource. If mapping claims 24*b* were inspected, the access control program 27 may authorize or deny access to requested maps or requested features of the mapping application 20*b*, for example. If radio claims 24*a* were inspected, the access control program 27 may authorize or deny access to the requested radio stations or requested features of the satellite radio application 20*a*, for example. The inspection of the claims 24*a* and 24*b* may involve determining an authorization level indicated in the claims.

Although in this example, the scenario-specific program 42 is depicted as inspecting the claims 50 and performing actions 19 responsive to the inspection, and the application 20*a* is depicted as inspecting the claims 24*a* and performing actions 17*a* responsive to the inspection, it will be appreciated that the inspection of a claim may be assigned to the scenario-specific program 42, the application 20*a*, or the local claims provider agent 26 depending on the implementation. Instead of the edge device user interface 13 of an edge computing device 34 sending a device input request 16*a*, a user interface 12*a* of the user computing device 12 may send the device input request 16*a* via the communication interface 15. If there are a plurality of applications 20*a* and 20*b* in the edge computing device 34, inspection and processing of a predetermined claim may be restricted to a first application 20*a*, and inspection and processing of another predetermined claim may be restricted to a second application 20*b*, for example, so that information processed in the first application 20*a* and the second application 20*b* is not shared with each other, as security boundaries 21*a* and 21*b* isolate the applications from each other and from the rest of the system 10.

Further, alternatively to the user 11 operating an edge device user interface 13 to send a device input request 16*a*, the user 11 operating a user computing device 12 to send an input request 18 to the cloud server 40, or the user 11 operating the user computing device 12 to communicate with the edge computing device 34 via the communication interface 15 to send the device input request 16*a*, a system process 14*a* of the OS 14 may control the edge computing device 34 to send the device input request 16*a*. An application 20*a* of the edge computing device 34 may perform actions 17*a* at the device level at the system process 14*a* of the OS 14, responsive to receiving and inspecting the claims in the local device input request 16*a*. In this alternative embodiment, the system process 14*a* refers to a "thread" or process in a multi-threaded OS 14 or OS component. Accordingly, claims based authorization of access to resources or configuration of resources in software systems may be controlled not only by user processes, but also by system processes.

Figure 4:
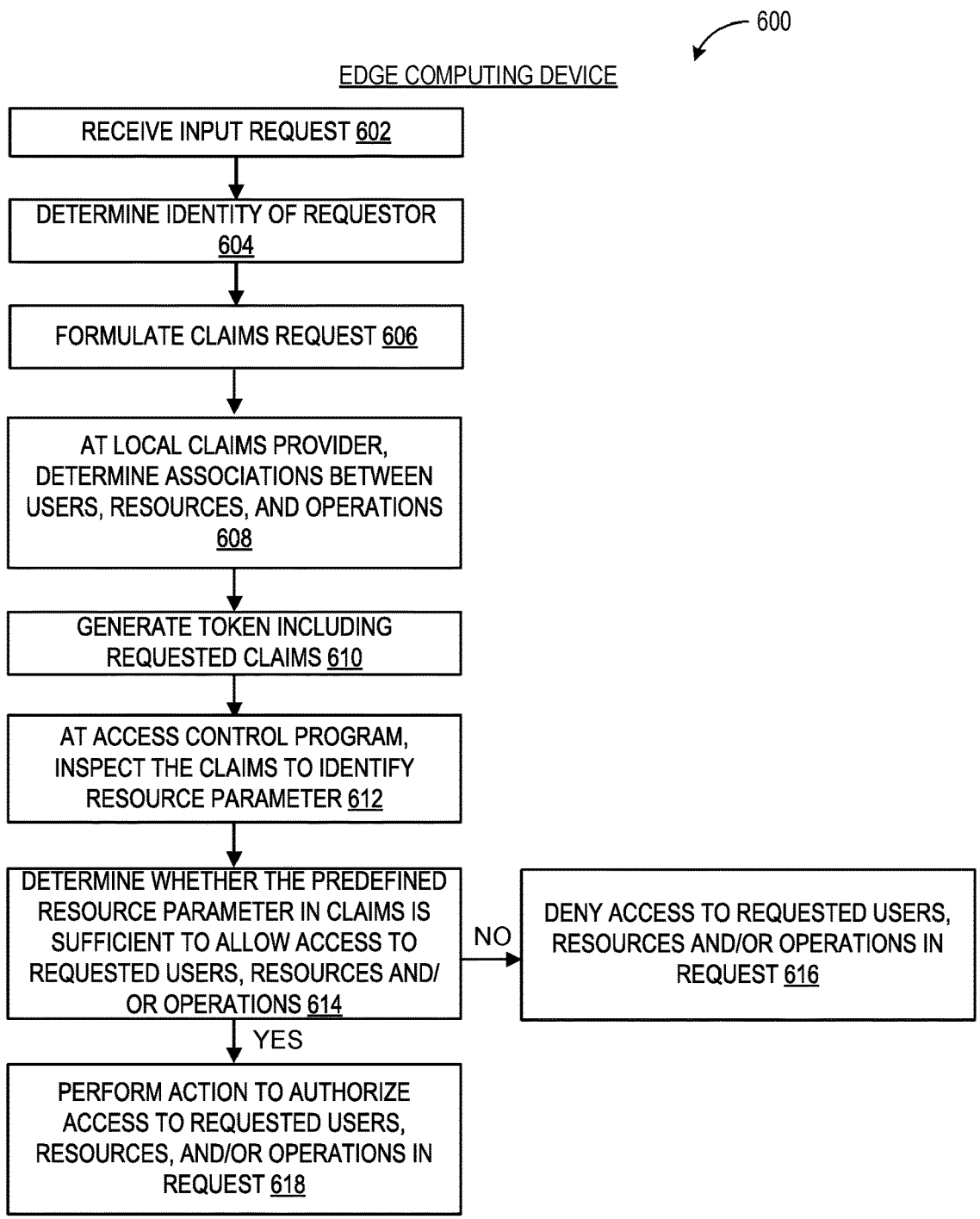
FIG. 4 is a flow chart of a method for performing access control for an edge computing device according to an example embodiment of the present disclosure.

FIG. 4 illustrates a flow chart of a method 600 for performing access control according to an embodiment of the present disclosure. The following description of method 600 is provided with reference to the software and hardware components described above and shown in FIG. 1 and FIGS. 3A to 3D. It will be appreciated that method 600 also may be performed in other contexts using other suitable hardware and software components.

With reference to FIG. 4, at 602 the method 600 may include the edge computing device receiving an input request from the user requesting access to or configuration of a resource of the edge computing device. At 604 the method 600 may include determining the identity of the requestor based upon a user authentication factor identified in the input request. At 606 the method 600 may include formulating a claim request. At 608 the method 600 may include, at the local claims provider, determining associations between users, resources, and operations. At 610 the method 600 may include generating a token including the requested claims. At 612 the method 600 may include, at the access control program, inspecting the claims to identify a predefined resource parameter. At 614 the method 600 may include determining whether a predefined resource parameter in the claims is sufficient to allow access to the requested users, resources and/or operations based on a predetermined policy. When it is determined that the predefined resource parameter in the claims is insufficient to allow access to the requested users, resources and/or operations in the request, at 616, the access control program denies access to the requested users, resources and/or operations in the request. When it is determined that the predefined resource parameter in the claims is sufficient to allow access to the requested users, resources and/or operations in the request, at 618, the access control program authorizes access to the requested users, resources and/or operations in the request.

Figure 5:
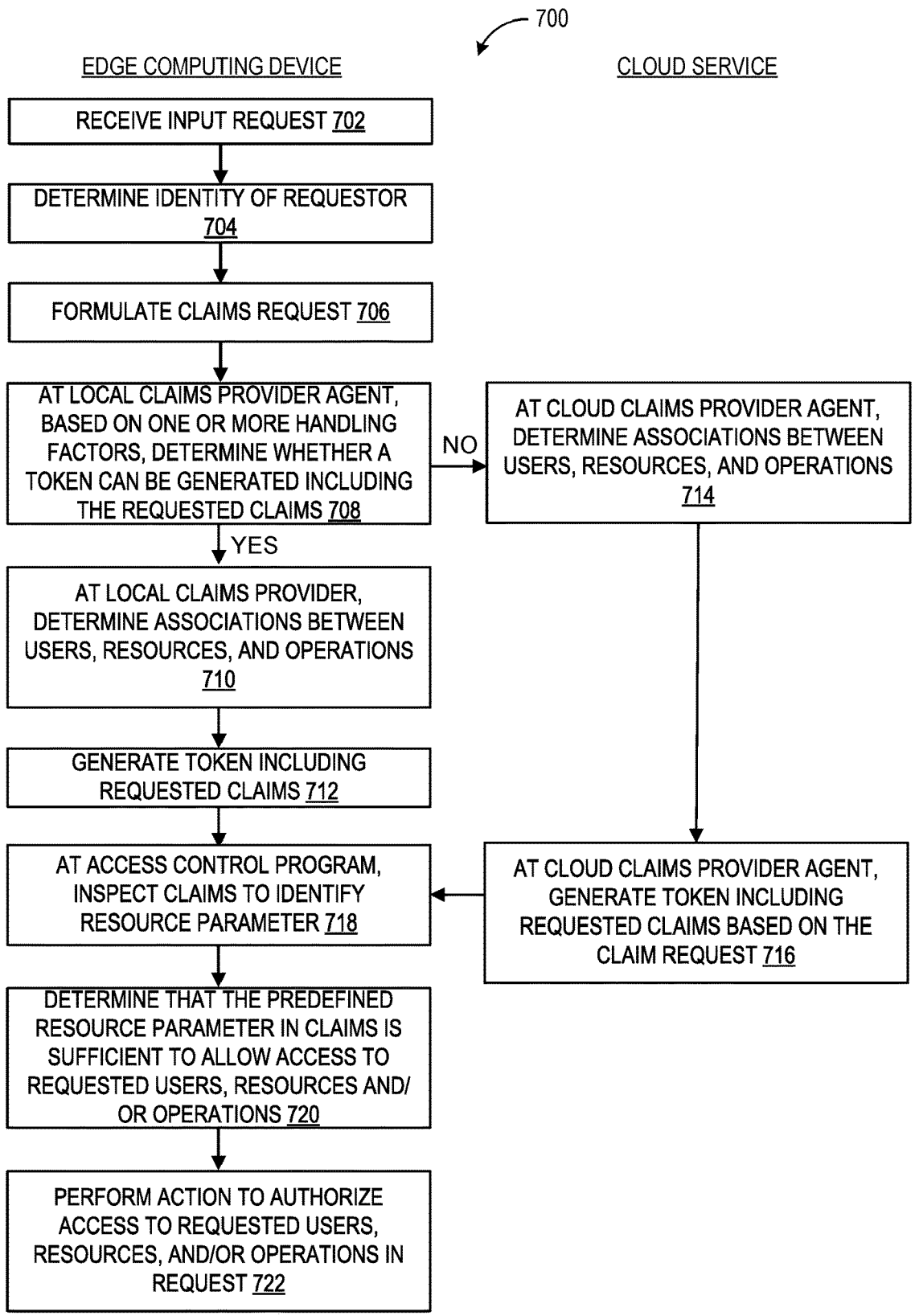
FIG. 5 is a flow chart of a method for performing access control for an edge computing device according to an example embodiment of the present disclosure.

FIG. 5 illustrates a flow chart of a method 700 for performing access control according to an embodiment of the present disclosure. The following description of method 700 is provided with reference to the software and hardware components described above and shown in FIG. 1 and FIGS. 3A to 3D. It will be appreciated that method 700 also may be performed in other contexts using other suitable hardware and software components.

With reference to FIG. 5, at 702 the method 700 may include the edge computing device receiving an input request from the user requesting access to or configuration of a resource of the edge computing device. At 704 the method 700 may include determining the identity of the requestor based upon a user authentication factor identified in the input request. At 706 the method 700 may include formulating a claims request. At 708 the method 700 may include, at the local claims provider, determining whether a token can be generated including the requested claims based on one or more handling factors. At 714, upon determining that a token cannot be generated by the edge computing device including the requested claims based on the one or more handling factors, the edge computing device sends a claims request to the cloud service-side claims provider agent, the cloud service-side claims provider agent at the cloud service receives the claims request and determines associations between the users, resources, and operations. At 716 at the cloud service-side claims provider agent, a token is generated including the requested claims and sent to the edge computing device based on the claims request. At 718 the edge computing device receives a token including the requested claims from the cloud service-side claims provider, and the edge computing device's access control program inspects the claims from the claims provider to identify a predefined resource parameter. At 720 the edge computing device determines that a predefined resource parameter in the claims is sufficient to authorize access to the requested users, resources and/or operations based on a predetermined policy. At 722 the edge computing device performs an action to enforce access control, authorizing access to or configuration of the requested users, resources, and/or operations in a request upon determining, based on the predetermined policy, that the predefined resource parameter in the claims is sufficient to allow access to the requested users, resources and/or operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
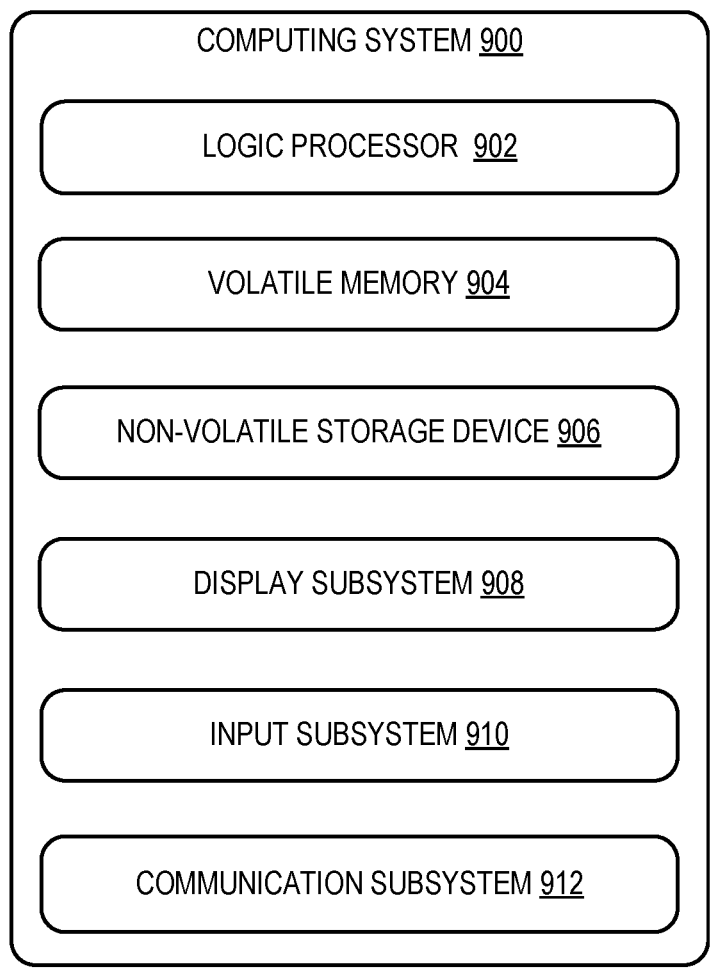
FIG. 6 shows an example computing environment of the present disclosure.

FIG. 6 schematically shows a non-limiting embodiment of a computing system 900 that can enact one or more of the methods and processes described above. Computing system 900 is shown in simplified form. Computing system 900 may embody the vehicle edge computing device 34 and cloud server 40 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 6.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as Bluetooth and HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a method of controlling an edge computing device, the method comprising: at the edge computing device: identifying an authentication factor of a user or a system process at the edge computing device; determining an identity of the user or the system process based upon the authentication factor; receiving an input from the user or the system process requesting access to or configuration of a resource of the edge computing device; determining whether the user or the system process has privileges to access or configure the resource by: formulating a claims request which requests claims based on the determined identity of the user or the system process; sending the claims request to a local claims provider agent executed by a processor of the edge computing device; determining, based on one or more claim request handling factors, that the local claims provider agent can generate a token including the requested claims, and in response generating the token with the requested claims; receiving at an access control program the token including the requested claims; inspecting the claims to identify a predefined resource parameter; and authorizing access to or configuration of the resource based on a predetermined policy that specifies the presence of the predefined resource parameter in the requested claims is sufficient to allow access to the resource. In this aspect, additionally or alternatively, the edge computing device may be installed on a vehicle; the request may indicate users, resources, and/or operations pertaining to the vehicle; and the access may be for an operation on the resource requested by the requesting user or the requesting system process. In this aspect, additionally or alternatively, determining whether the user or the system process has privileges to access or configure the resource may be further accomplished by: determining, based on one or more claim request handling factors, that the local claims provider agent cannot generate the token including the requested claims, and based on this determination, sending a request to a cloud service-side claims provider executed by a server over a computing network and receiving the token including the requested claims from the cloud service-side claims provider in response. In this aspect, additionally or alternatively, at least one of the claims may have a range of validity for a predetermined limited time period. In this aspect, additionally or alternatively, the requested claims may describe associations between users, operations which are services, and resources which are objects. In this aspect, additionally or alternatively, the associations may describe a combination of users and services, services and objects, users and objects, and/or a combination of users and services and objects. In this aspect, additionally or alternatively, the claims may be formatted to describe the associations between the users, services, and objects. In this aspect, additionally or alternatively, each association may be assigned one of a plurality of authorization levels. In this aspect, additionally or alternatively, the predefined resource parameter may be the authorization level of the association of the requested claims. In this aspect, additionally or alternatively, each association may be assigned one of the plurality of authorization levels based on external data sources comprising a series of records of each association. In this aspect, additionally or alternatively, the series of records may describe the authorization levels of each association and/or hierarchical relationships of the associations.

Another aspect provides an edge computing device, comprising: a processor and memory, the processor configured to execute software instructions stored within the memory to: identify an authentication factor of a user or a system process at the edge computing device; determine an identity of the user or the system process based upon the authentication factor; receive an input from the user or the system process requesting access to or configuration of a resource of the edge computing device; determine whether the user or the system process has privileges to access or configure the resource by: formulating a claims request which requests claims based on the determined identity of the user or the system process; sending the claims request to a local claims provider agent executed by the processor of the edge computing device; and determining, based on one or more claim request handling factors, that the local claims provider agent can generate a token including the requested claims, and in response generating the token with the requested claims; receive at an access control program the token including the requested claims; inspect the claims to identify a predefined resource parameter; and authorize access to or configuration of the resource based on a predetermined policy that specifies the presence of the predefined resource parameter in the requested claims is sufficient to allow access to the resource. In this aspect, additionally or alternatively, the edge computing device may be installed on a vehicle; the request may indicate users, resources, and/or operations pertaining to the vehicle; and the access may be for an operation on the resource requested by the requesting user or the requesting system process. In this aspect, additionally or alternatively, determining whether the user or the process has privileges to access or configure the resource may be further accomplished by: determining, based on one or more claim request handling factors, that the local claims provider agent cannot generate the token including the requested claims, and in response sending a request to a cloud service-side claims provider executed by a server over a computing network and receiving the token including the requested claims from the cloud service-side claims provider in response. In this aspect, additionally or alternatively, at least one of the claims may have a range of validity for a predetermined limited time period. In this aspect, additionally or alternatively, the requested claims may describe associations between users, operations which are services, and resources which are objects. In this aspect, additionally or alternatively, each association may be assigned one of a plurality of authorization levels. In this aspect, additionally or alternatively, the predefined resource parameter may be the authorization level of the association of the requested claims. In this aspect, additionally or alternatively, each association may be assigned one of the plurality of authorization levels based on external data sources comprising a series of records of each association.

Another aspect provides an edge computing device, comprising: a processor and memory, the processor configured to execute software instructions stored within the memory to: identify a user authentication factor of a user at the edge computing device; determine an identity of the user based upon the user authentication factor; receive a user input from the user requesting access to or configuration of a resource of the edge computing device; determine whether the user has privileges to access or configure the resource by: formulating a claims request which requests claims based on the determined identity of the user; sending the claims request to a local claims provider agent executed by the processor of the edge computing device; and determining, based on one or more claim request handling factors, whether the local claims provider agent can generate a token including the requested claims, and if so, generating the token with the requested claims, else sending a request to a cloud service-side claims provider executed by a server over a computing network and receiving the token including the requested claims from the cloud service-side claims provider in response; receive at an access control program the token including the requested claims; inspect the claims to identify a predefined resource parameter; and authorize access to or configuration of the resource based on a predetermined policy that specifies the presence of the predefined resource parameter in the requested claims is sufficient to allow access to the resource, the edge computing device being installed on a vehicle; the request indicating users, resources, and/or operations pertaining to the vehicle; and the access being for an operation on the resource requested by the requesting user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of controlling an edge computing device, the method comprising:
at the edge computing device:
identifying an authentication factor of a user or a system process at the edge computing device;
determining an identity of the user or the system process based upon the authentication factor;
receiving an input from the user or the system process requesting access to or configuration of a resource of the edge computing device;
determining whether the user or the system process has privileges to access or configure the resource by:
formulating a claims request which requests claims based on the determined identity of the user or the system process, the claims request indicating one or more requested claims for the access to or configuration of the resource;
sending the claims request to a local claims provider agent executed by a processor of the edge computing device;
determining, based on one or more claim request handling factors, that the local claims provider agent can generate a token including the requested claims of the claims request;
in response to determining that the local claims provider agent can generate the token, generating the token with the requested claims via the local claims provider;
sending the token from the local claims provider to a separate application program executed by the processor of the edge computing device that is associated with the access to or configuration of the resource;
receiving, from the application program at an access control program executed by the processor of the edge computing device, the token including the requested claims;
inspecting the requested claims of the token at the access control program to identify a predefined resource parameter; and
authorizing, at the access control program, the access to or configuration of the resource based on a predetermined policy that specifies the presence of the predefined resource parameter in the requested claims is sufficient to allow the access to or configuration of the resource via the application program.

2. The method of controlling the edge computing device of claim 1, wherein
the edge computing device is installed on a vehicle;
the request indicates users, resources, and/or operations pertaining to the vehicle; and
the access is for an operation on the resource requested by the requesting user or the requesting system process.

3. The method of controlling the edge computing device of claim 1, wherein determining whether the user or the system process has privileges to access or configure the resource is further accomplished by:
determining, based on one or more claim request handling factors, that the local claims provider agent cannot generate the token including the requested claims, and based on this determination, sending a request to a cloud service-side claims provider executed by a server over a computing network and receiving the token including the requested claims from the cloud service-side claims provider in response.

4. The method of controlling the edge computing device of claim 1, wherein
at least one of the claims has a range of validity for a predetermined limited time period.

5. The method of controlling the edge computing device of claim 1, wherein
the requested claims describe associations between users, operations which are services, and resources which are objects.

6. The method of controlling the edge computing device of claim 5, wherein
the associations describe a combination of users and services, services and objects, users and objects, and/or a combination of users and services and objects.

7. The method of controlling the edge computing device of claim 5, wherein
the claims are formatted to describe the associations between the users, services, and objects.

8. The method of controlling the edge computing device of claim 7, wherein
each association is assigned one of a plurality of authorization levels.

9. The method of controlling the edge computing device of claim 8, wherein
the predefined resource parameter is the authorization level of the association of the requested claims.

10. The method of controlling the edge computing device of claim 8, wherein
each association is assigned one of the plurality of authorization levels based on external data sources comprising a series of records of each association.

11. The method of controlling the edge computing device of claim 10, wherein
the series of records describe the authorization levels of each association and/or hierarchical relationships of the associations.

12. An edge computing device, comprising:
a processor and memory, the processor configured to execute software instructions stored within the memory to:
identify an authentication factor of a user or a system process at the edge computing device;
determine an identity of the user or the system process based upon the authentication factor;
receive an input from the user or the system process requesting access to or configuration of a resource of the edge computing device;
determine whether the user or the system process has privileges to access or configure the resource by:
formulating a claims request which requests claims based on the determined identity of the user or the system process, the claims request indicating one or more requested claims for the access to or configuration of the resource;
sending the claims request to a local claims provider agent executed by the processor of the edge computing device; and
determining, based on one or more claim request handling factors, that the local claims provider agent can generate a token including the requested claims of the claims request;
in response to determining that the local claims provider agent can generate the token, generating the token with the requested claims via the local claims provider;
send the token from the local claims provider to a separate application program executed by the processor of the edge computing device that is associated with the access to or configuration of the resource;
receive, from the application program at an access control program executed by the processor of the edge computing device, the token including the requested claims;
inspect the requested claims of the token at the access control program to identify a predefined resource parameter; and
authorize, at the access control program, the access to or configuration of the resource based on a predetermined policy that specifies the presence of the predefined resource parameter in the requested claims is sufficient to allow the access to or configuration of the resource via the application program.

13. The edge computing device of claim 12, wherein
the edge computing device is installed on a vehicle;
the request indicates users, resources, and/or operations pertaining to the vehicle; and
the access is for an operation on the resource requested by the requesting user or the requesting system process.

14. The edge computing device of claim 12, wherein determining whether the user or the system process has privileges to access or configure the resource is further accomplished by:
determining, based on one or more claim request handling factors, that the local claims provider agent cannot generate the token including the requested claims, and in response sending a request to a cloud service-side claims provider executed by a server over a computing network and receiving the token including the requested claims from the cloud service-side claims provider in response.

15. The edge computing device of claim 13, wherein
at least one of the claims has a range of validity for a predetermined limited time period.

16. The edge computing device of claim 13, wherein
the requested claims describe associations between users, operations which are services, and resources which are objects.

17. The edge computing device of claim 16, wherein
each association is assigned one of a plurality of authorization levels.

18. The edge computing device of claim 17, wherein
the predefined resource parameter is the authorization level of the association of the requested claims.

19. The edge computing device of claim 17, wherein
each association is assigned one of the plurality of authorization levels based on external data sources comprising a series of records of each association.

20. An edge computing device, comprising:
a processor and memory, the processor configured to execute software instructions stored within the memory to:
identify a user authentication factor of a user at the edge computing device;
determine an identity of the user based upon the user authentication factor;

receive a user input from the user requesting access to or configuration of a resource of the edge computing device;
determine whether the user has privileges to access or configure the resource by:
  formulating a claims request which requests claims based on the determined identity of the user, the claims request indicating one or more requested claims for the access to or configuration of the resource;
  sending the claims request to a local claims provider agent executed by the processor of the edge computing device; and
  determining, based on one or more claim request handling factors, whether the local claims provider agent can generate a token including the requested claims of the claims request, and if so, generating the token with the requested claims via the local claims provider, else sending a request to a cloud service-side claims provider executed by a server over a computing network and receiving the token including the requested claims from the cloud service-side claims provider in response;
send the token from the local claims provider to a separate application program executed by the processor of the edge computing device that is associated with the access to or configuration of the resource;
receive, from the application program at an access control program executed by the processor of the edge computing device, the token including the requested claims;
inspect the requested claims of the token at the access control program to identify a predefined resource parameter; and
authorize, at the access control program, the access to or configuration of the resource based on a predetermined policy that specifies the presence of the predefined resource parameter in the requested claims is sufficient to allow the access to or configuration of the resource via the application program, wherein
  the edge computing device is installed on a vehicle;
  the request indicates users, resources, and/or operations pertaining to the vehicle; and
  the access is for an operation on the resource requested by the requesting user.

* * * * *